J. T. LISTER.
TIRE.
APPLICATION FILED SEPT. 22, 1916.

1,355,986.

Patented Oct. 19, 1920.

Inventor:
John T. Lister
by Thurston & Kwis
Attys.

UNITED STATES PATENT OFFICE.

JOHN T. LISTER, OF CLEVELAND, OHIO.

TIRE.

1,355,986.   Specification of Letters Patent.   Patented Oct. 19, 1920.

Application filed September 22, 1916. Serial No. 121,541.

*To all whom it may concern:*

Be it known that I, JOHN T. LISTER, a citizen of the United States, residing at Cleveland, in the county of Cuyahoga and State of Ohio, have invented a certain new and useful Improvement in Tires, of which the following is a full, clear, and exact description.

This invention relates to tires for automobiles and the like, and has for its object to provide what is known as a semi-solid tire which is durable and efficient, it being one of the particular objects to construct the tire so that it will hold the air without leakage and will be able to withstand successfully, load stresses and other stresses such as are encountered when a tire is subjected to rough usage.

One of the features of the tire is the materials which are incorporated therein, and the cross-sectional shape of the tire, that is to say, the manner in which the stress resisting materials are formed and arranged. The invention resides also especially in the shape and manner of securing the inner or rim portion of the tire to the part forming the sides and tread portion.

Figure 1:
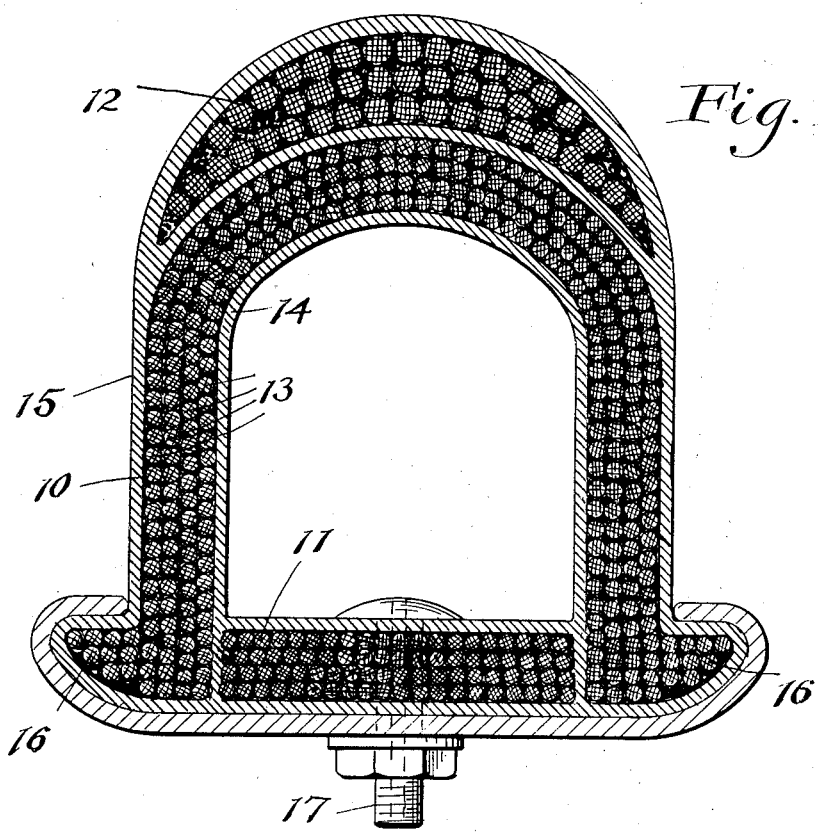
Figure 2:
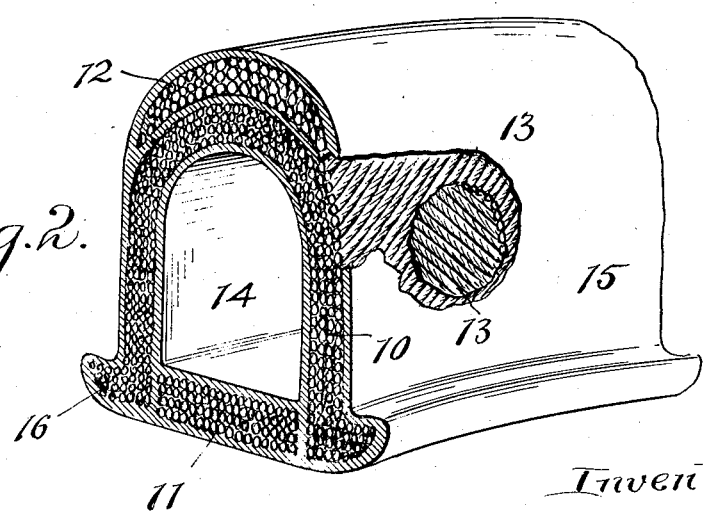

In the accompanying sheet of drawings wherein I have shown the preferred form of my invention, Figure 1 is a cross-sectional view of the improved tire of the clencher type, attached to the rim; and Fig. 2 is a perspective view of a portion of the tire with portions broken away.

The tire here shown, includes a main or body portion 10, which is substantially U-shaped, the sides being substantially straight and parallel and extending inwardly in straight, parallel planes to the rim. The major portion or body 10 not including the inner part 11 or an extra tread portion 12 which is applied to the peripheral part of the body, is preferably formed in one integral or continuous piece or part from a series of superposed layers 13 of strong and fairly heavy cords with the cords of adjacent layers at angles of nearly 90° with respect to each other, as illustrated in Fig. 2, and preferably extending around the tire at about a 45° angle. These cords are thoroughly rubberized so that when formed into the tire shape, and when the tire is vulcanized, there will be formed an impervious, imperforate solid body of cords and rubber. If desired, between adjacent layers may be arranged thin layers of unvulcanized, sticky rubber which assists in reducing friction of the adjacent layers in use, and assists in forming the solid mass of rubber and cord.

At the base or inner portion of the U-shaped body 10, the space between the straight and parallel sides is closed by the part 11 in the form of a strip which is thoroughly vulcanized at its edges in between the sides of the U-shaped portion. This closing piece or strip is preferably formed of the same materials, and is of the same thickness as that first described. In fact, it is preferably formed integral with the part forming the U-shaped portion and is cut therefrom, and subsequently placed in the position described, and vulcanized. In explanation of this it may be said that the portions 10 and 11 are preferably formed on an annular core, U-shaped in cross-section, that is, of a cross-sectional shape substantially that of the inside of the tire. In other words, it will have a flat, inner periphery, a rounded outer periphery and straight sides. The cords forming the layers will be wound spirally around this core, forming a closed tube with the cross-sectional shape indicated. Before the first layer is wound on the core, a layer of rubber 14 is preferably placed on the core, and when the desired number of layers of the cord, or cord and intervening layers of rubber are applied to the core, a layer of rubber 15 is placed on the outside of the tube so that when the tube is formed, it will be covered on the inside and outside with layers of rubber.

After the tube is formed, the inner portion, that is, the portion overlying the flat inner periphery of the core, is cut out thus forming a flat annulus or ring. Then the inner edge portions of the U-shaped part are bent outwardly to form the beads 16 and when the beads are formed, this flat ring or annulus 11 which was cut from the tube is placed in position between the bead portions, or in substantially the position it occupied prior to being cut from the tube, and after vulcanization a tube is formed which is substantially the shape of the tube when formed on the core.

In this case I have shown a clencher type of tire, but instead of the clencher bead the tire may be given a straight side bead as will be readily understood.

To complete the tire, and before final vulcanization, the tread portion 12 is applied to the tire. In this case I have shown a tread portion composed of a body of rubber and cords which may extend circumferentially around the tread, and which are preferably somewhat thicker than the cords forming the body of the tire. In the event the tread portion 12 becomes worn or torn in use, it may be removed and replaced with a new tread in all respects similar to it when first applied.

A tire thus formed, when filled with air supplied under pressure through a valve stem such as illustrated at 17, is able to hold the air pressure with substantially no leakage, as the walls are so thick and solid, and the straight portions are so rigid that there is little chance for leakage or punctures, and even should there be leakage, or if the air pressure initially was less than normal, the sides of the tire are so formed that they can support without, or with very little assistance from the air, the load of the vehicle, and even then the tire will not be crushed down to the rim as is always the case with a pneumatic tire when deflated.

Having thus described my invention, what I claim is:

A semi-solid tire composed of a closed, hollow, air-tight body formed by a substantially U-shaped member of superposed layers of cord, and a substantially straight annular piece of superposed layers of cord arranged between and secured at its edges to the inner portions of said sides.

In testimony whereof I hereunto affix my signature.

JOHN T. LISTER.